United States Patent Office 3,470,761
Patented Oct. 7, 1969

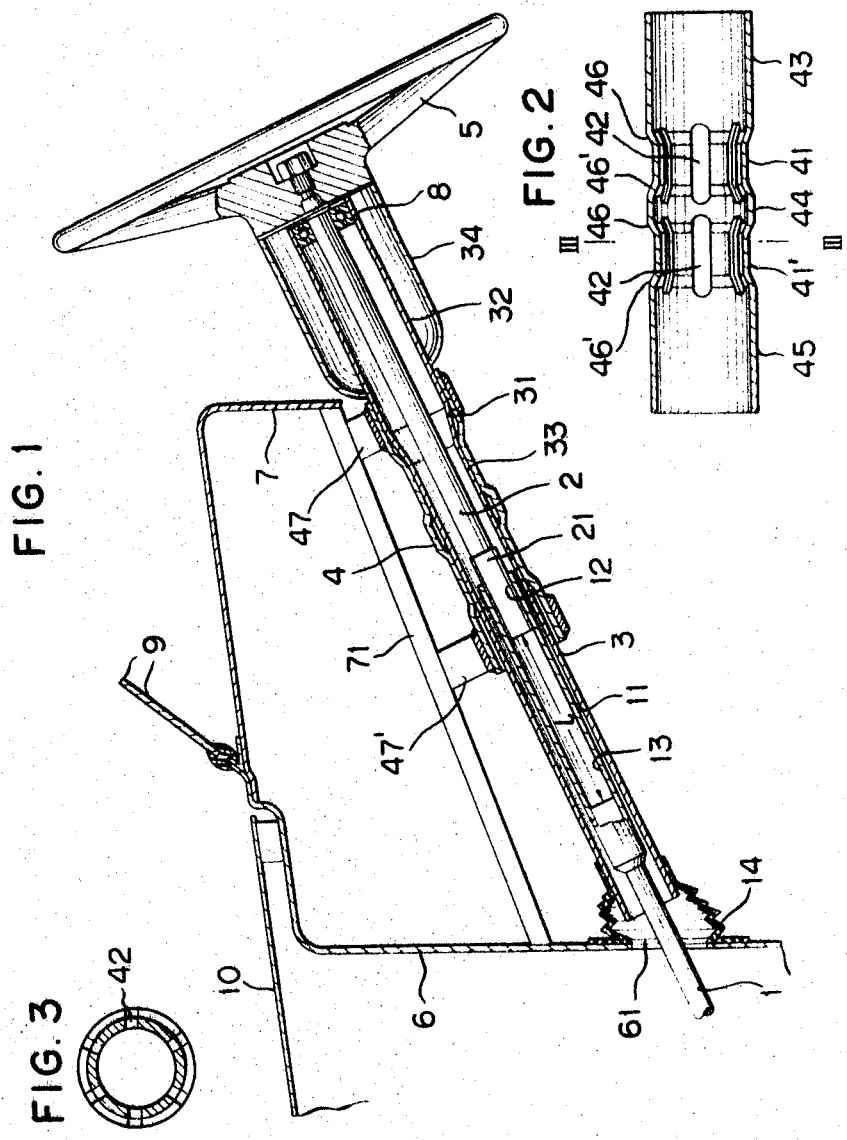

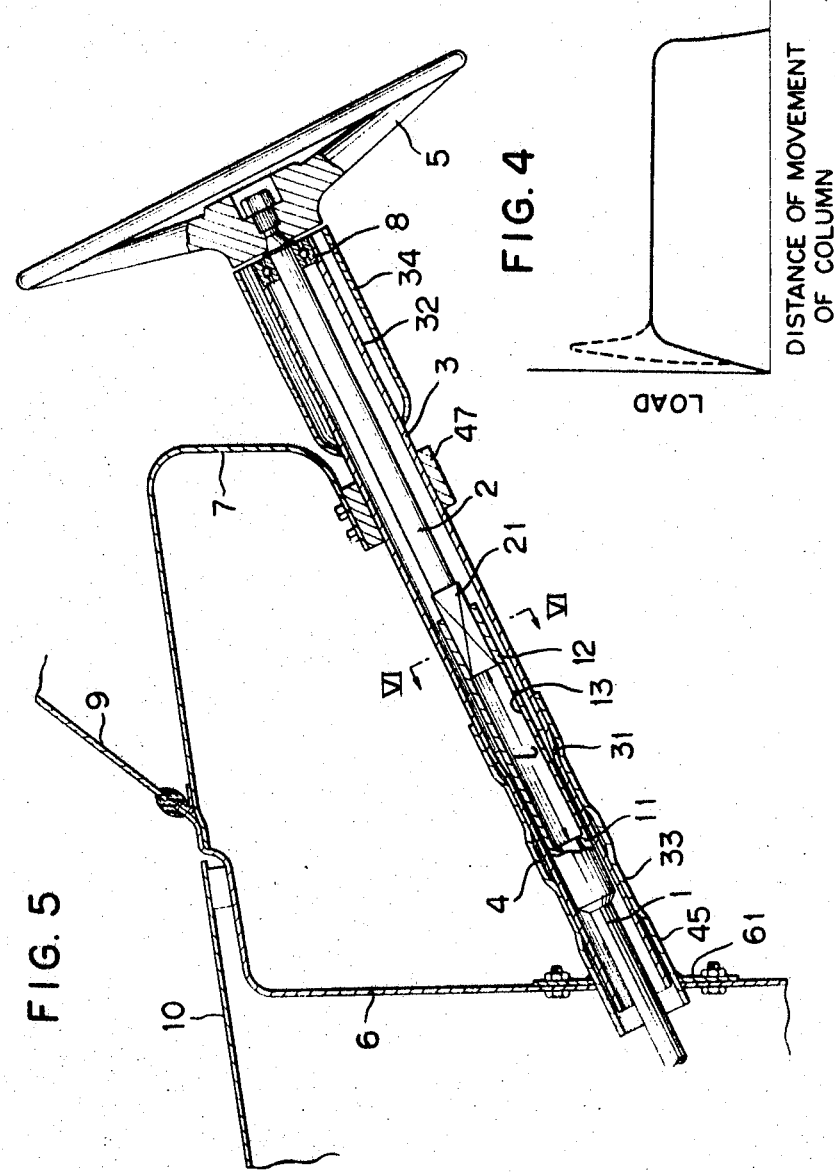

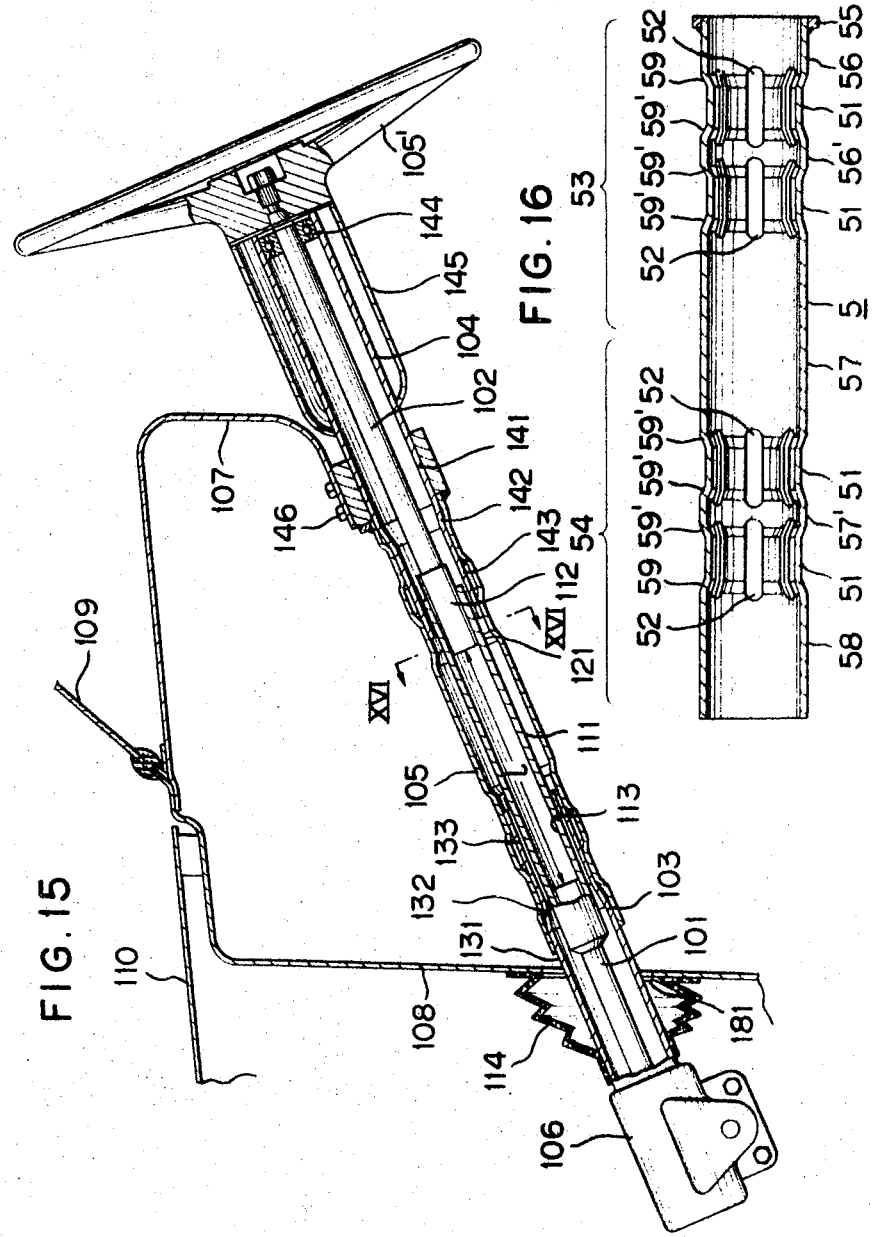

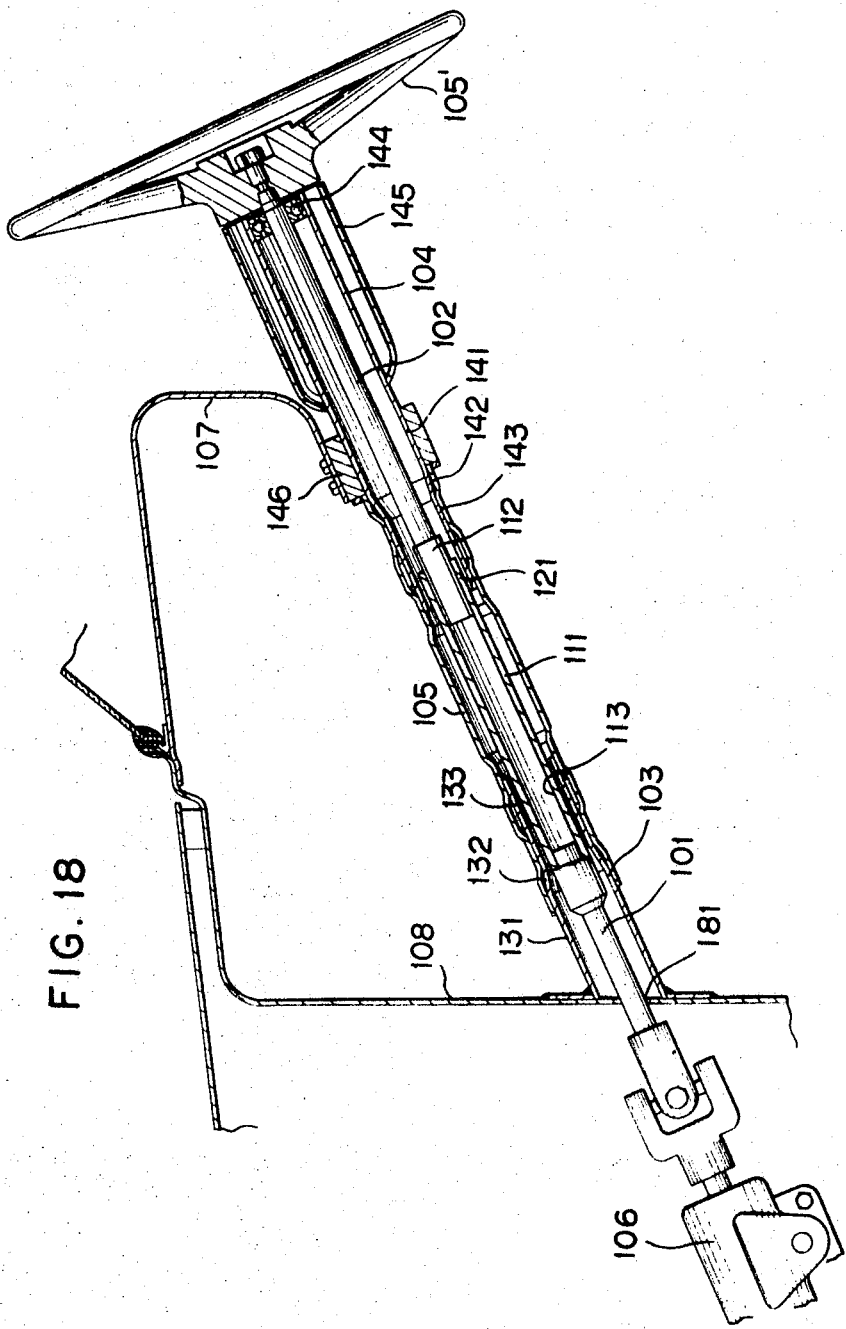

3,470,761
SAFETY STEERING ASSEMBLY
Kenjiro Okamoto and Hideo Okoshi, Fujisawa-shi, Japan, assignors to Nippon Seiko Kabushiki Kaisha, Tokyo, Japan, a corporation of Japan
Filed Sept. 25, 1967, Ser. No. 670,292
Claims priority, application Japan, Jan. 30, 1967, 42/5,575, 42/5,576
Int. Cl. B62d 1/16; B60k 27/00, 33/00
U.S. Cl. 74—492
9 Claims

ABSTRACT OF THE DISCLOSURE

A collapsible, impact-absorbing steering assembly is desirable for safety reasons. In this invention, a telescopic steering shaft is mounted within a steering column, the column having larger and smaller diameter portions separated by a tapered portion. An impact-absorbing section is located around this column and comprises at least one reduced-diameter section having a plurality of slots or holes therein. On impact of the vehicle, the shafts telescope and the impact-absorbing section and the columns plastically deform. Such deformation and friction between the columns absorb impact energy.

---

This invention relates to a safety steering assembly for an automobile.

The danger of injury or death to the driver of an automobile presented by the steering wheel and/or steering shaft is well known.

A safety steering shaft has been proposed in U.S. Patent 3,262,332 issued to Robert D. Wight on July 26, 1966. However, such devices require complicated additional equipment for achieving their purpose and are very expensive.

The principal feature of the present invention is to provide a safety steering assembly having an axially telescoping steering shaft, and producing a resistance to the telescoping action by means of an impact-absorbing section mounted around the shaft. Elastic and plastic deformation of this section, and frictional force between the impact-absorbing section and the steering column, reduce the load applied to the driver.

Further, in many small cars, there is only a short distance from the front end of the car to the driver's position, so that it is not possible to elongate the steering shaft or column by providing an impact-absorbing section therein. Another feature of the present invention is, therefore, to provide an assembly in which an impact-absorbing section is provided without elongating the steering shaft.

Furthermore, in small cars, it is usual that the steering gear box be directly coupled to the steering shaft. On impact of such an automobile, the steering gear box is abruptly pushed up, and pushes both the steering shaft and steering column. The steering column is affected by both said pushing up of the gear box and the pushing down action by the driver, i.e., the driver's reaction to the impact. Another feature of the present invention is, therefore, to provide an impact-absorbing section to absorb the impact forces from both the upper and lower directions.

According to the present invention, a safety steering assembly is provided which comprises a safety steering shaft comprising a lower steering shaft connected to the steering gear box, an upper steering shaft connected to the steering wheel, means for fitting one steering shaft within the other steering shaft, and means for transmitting rotational force from one shaft to the other. The invention also comprises a steering column fitting externally of the steering shafts to retain them rotatably; the column comprises a first portion having large diameter, a second portion having small diameter and a tapered portion formed between the first and second portions. Lastly, an impact-absorbing section is provided having at least one reduced-diameter portion having a plurality of holes, and this fits around the steering column.

According to the one embodiment of the present invention, the impact-absorbing section is fitted externally to the steering column, and is also fixed to the body of the automobile so that, in the normal state, the impact-absorbing section retains the steering shaft assembly relative to the body of automobile. On impact, the impact-absorbing section is forced over the large diameter portion of the steering column, to produce a frictional force by elastic and plastic deformation of the impact-absorbing section.

According to another embodiment of the invention, the steering column consists of lower and upper columns fitted externally to the steering shaft, both columns having tapered portions between large and small diameter portions. The lower column is directly connected to the steering gear box, and the upper column is slidably mounted on the body of an automobile. The impact-absorbing section consists of two interconnected absorbing sections and a stopper. One end of the absorbing section is fitted externally to the lower column, and the other end thereof is fitted externally to the upper column. On impact, the forces exerted from the lower (first) and upper (second) directions are absorbed and buffered by elastic and plastic deformation and frictional force of the impact-absorbing sections.

The present invention will now be explained in more detail, referring to the embodiments shown in the accompanying drawings, in which:

FIG. 1 is a cross-sectional elevation of a first embodiment of the invention;

FIG. 2 is a cross-sectional elevation of the impact-absorbing section of the first embodiment;

FIG. 3 is a transverse section taken along line III—III of FIG. 2;

FIG. 4 is a curve showing the relation between the distance of movement of the column relative to the load working thereon on impact;

FIG. 5 is a cross-sectional elevation of a second embodiment of the invention;

FIG. 15 is a cross-sectional elevation of a third embodiment of the invention;

FIG. 16 is a detailed view of the impact-absorbing section of FIG. 15;

FIG. 18 is a cross-sectional elevation of a fifth embodiment of the invention.

Figure 8:
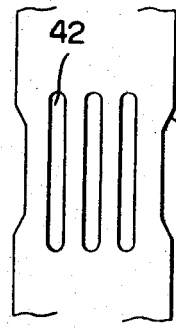
FIG. 8 through FIG. 14 show various shapes of the impact-absorbing section in partially developed form.

The first embodiment of the invention (FIGS. 1 to 3) discloses that the safety steering shaft assembly is retained within the body of an automobile by fixing it to a member 71 provided between the fire wall 6 and instrument panel 7 of the automobile. The windshield 9 and hood 10 of the vehicle are also shown. The steering shaft assembly comprises lower and upper steering shafts 1 and 2, steering column 3 and impact-absorbing section 4. The lower end of lower shaft 1 is connected to the steering gear box (not shown) through a universal joint (not shown). The upper portion of shaft 1 is formed as a hollow cylinder 11 having a spline boss 12 formed on the upper end thereof. Spline boss 12 has sufficient axial length to transmit rotational force. The length $l$ of cylinder 11, defined by inner surface 13, has an inside diameter slightly larger than the diameter of spline shaft 21, described hereinafter. The upper end of the upper shaft 2 is connected to a conventional steering wheel 5 and the lower end thereof is formed as spline shaft 21, having a diameter slightly smaller than the inside diameter of cylinder 11. Spline shaft 21 fits in the spline boss 12 to form a rotational force transmitting means.

The upper shaft 2 fits into the cylindrical hole 13 of the lower shaft 1, and the total length of the upper and lower shafts can thus be reduced in the axial direction by telescopic action. The length $l$ of the cylindrical hole 13 is determined by consideration of the required shortening of the steering shaft. Column 3 is a cylinder having a large diameter portion 32, a small diameter portion 33, and a slightly tapered portion 31 interconnecting portions 32 and 33. The upper portion of the column 3 retains the steering shaft 2 by means of bearing 8. The lower end of column 3 is covered by a flexible dust seal cover 14 so that column 3 can pass through a hole 61 in the fire wall 6. The large diameter portion 32 of column 3 is provided with a cover 34 of synthetic resin, plastic or the like for installation therewithin of electrical components and the like. Cover 34 can be easily broken on impact.

The impact-absorbing section is shown in detail in FIGS. 2 and 3. It comprises two reduced-diameter portions 41 and 41', and a plurality of holes 42 elongated in the axial direction. Between portions 41 and 41' and large diameter portions 43, 44 and 45 there are tapered portions 46 and 46', each of which has a steeper slope than the tapering portion 31 of the column 3. Holes 42 extend across tapered portions 46, 46' to the respective large diameter portions. The shape, size, number and position of holes 42 and reduced-diameter portions 41, 41' relate to the diameter, total length and thickness of the impact-absorbing section 4, and are determined to give section 4 a rigidity suitable for retaining the steering shaft assembly under normal conditions, and to absorb impact forces by means of elastic and plastic deformation and friction upon impact of the vehicle. Mounting brackets 47, 47' are soldered or welded to the large diameter portions 43 and 45, respectively, and are also attached to member 71 to retain the entire assembly in position. The inside diameter of reduced-diameter portions 41 and 41' are slightly smaller than the external diameter of the small diameter portion 33, to provide a press-fit between impact-absorbing section 4 and column 3, thereby retaining the steering shaft assembly in its proper position. The internal surface of large diameter portion 43 of impact-absorbing section 4 and the external surface of large diameter portion 32 of column 3 are also lightly press-fitted.

In normal operation, the steering shaft assembly is fitted to the member 71, and the length of the steering shaft is controlled by the fitting of absorbing section 4 and column 3 to hold the steering wheel 5 at an appropriate position, so that rotational force applied to the steering wheel 5 is transmitted to the steering gear box through the spline shaft 21 and the spline boss 12. Upon impact of the automobile, the front portion thereof pushes the steering gear box to the rear. Presuming that a universal joint is provided between the steering gear box and the steering shaft, so that the steering shaft is not directly coupled to the gear box, the movement of lower shaft 1 will not affect column 3. When lower shaft 1 is pushed up, the upper shaft 2 slides into the cylinder 11 by an amount equal to the displacement of the lower shaft. Thus, the pushing up of the steering shaft assembly itself is avoided. If and when the driver is thrown forward onto steering wheel 5 by reaction to the impact, column 3 and upper shaft 2 are pushed down. Therefore, upper shaft 2 further slides into the cylinder 11, and column 3 is forced into tapered portion 46, by adjacent tapered portion 31, to widen the internal surface of reduced-diameter portion 41. At this instant, a first resistance is caused by the sliding friction between the internal surface of reduced-diameter portion 41 and small diameter portion 33 of column 3. Then, as tapered portion 31 slides into the reduced-diameter portion 41, the latter deforms elastically and plastically to produce a second resistance. Deformation further progresses as large diameter portion 32 slides into reduced-diameter portion 41, until the entire length of impact-absorbing section 4 between large diameter portions 43, 45 is deformed. Resistance caused by all of this deformation absorbs impact energy.

Consequently, steering wheel 5 moves to a lower position than its normal position, breaking cover 34 by impact against impact-absorbing section 4 or instrument panel 7. Breaking cover 34 does not disturb the reduction of the length of the steering shaft assembly, but does absorb some impact energy.

The load on the driver is represented by the vertical axis of the curve of FIG. 4, relative to displacement of the column. The lesser the load, the safer it is for the driver. Thus, the longer distance the column moves, the greater the absorption of total impact energy.

For this purpose, the large diameter portion 43 of impact-absorbing section 4 and the large diameter portion 32 of column 3 are loosely fitted, so as to decrease friction between the inner surface of portion 43 and the outer surface of portion 32. Also, the taper of portion 31 of the column 3 has less slope than the taper of portion 46, so as to produce gradual deformation. This avoids any sharp increment of load at the initial state of the movement of the column 3, as shown in the dotted line in FIG. 4.

Figure 6:
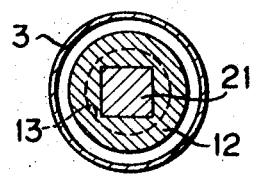
FIG. 6 is a transverse section taken along line VI—VI of FIG. 5.

A second embodiment of the invention is shown in FIGS. 5 and 6, wherein parts similar to those shown in FIG. 1 have the same reference numerals. The steering shaft assembly is mounted on the fire wall 6 of an automobile. The assembly comprises steering shafts 1 and 2, steering column 3, and impact-absorbing section 4.

The rotational force transmitting means in this embodiment includes a boss 12 having a rectangular cross section at the upper end of cylinder 11 of lower shaft 1, and the inner diameter of cylindrical hole 13 is made larger than the diagonal of the rectangular boss 12. The lower end 21 of upper shaft 2 is rectangular, to fit within the rectangular boss 12, to form a rotational force transmitting means. Rectangular column 21 is thus slidable into the cylinder 11. FIG. 6 shows this in a transverse section taken along line VI—VI of FIG. 5.

The main difference of the second embodiment from the first embodiment resides in the means retaining the steering shaft assembly to the body of an automobile. The impact-absorbing section 4 is fixed to the firewall 6 by means of a mounting flange 61 soldered or welded to large diameter portion 45, and large diameter portion 32 of the column 3 is slidably mounted to the instrument panel 7 by means of mounting member 47, made of low friction material.

The second embodiment is preferably used in automobiles where a member interconnecting the firewall 6 and instrument panel 7 (i.e., member 71 in FIG. 1) is not provided. Upon impact of the automobile, large diameter portion 32 of the column 3 slides down the inner surface of the mounting member 47. Telescoping of the steering shafts and deformation of the impact absorbing section are quite similar to the effects described in connection with the first embodiment.

Figure 7:
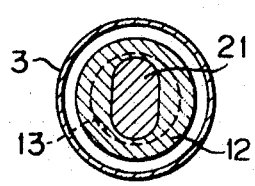
FIG. 7 shows another embodiment of a rotational force transmitting means similar to that shown in FIG. 6.

FIG. 7 shows another embodiment of the rotational force transmitting means where, in place of a rectangular boss and column, a combination of boss-column having an oblong cross section is employed for transmitting rotational force between the two shafts. Needless to say, other means of transmitting the rotational force while maintaining a slidable relation in the axial direction can be employed.

Figure 9:
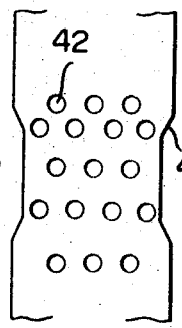
Figure 10:
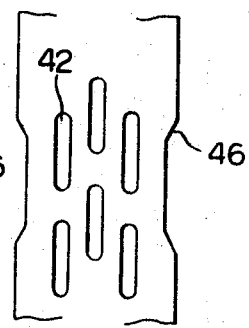
Figure 11:
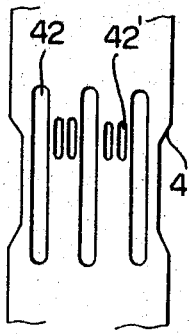
Figure 12:
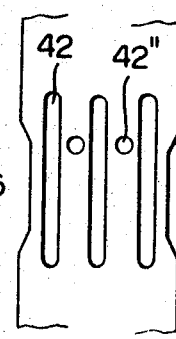
Figure 13:
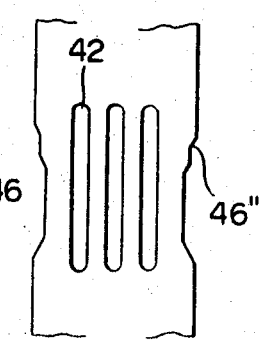
Figure 14:
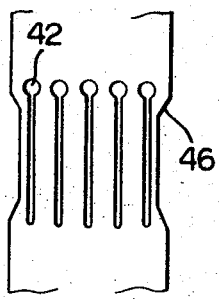

FIGS. 8 through 14 show various embodiments of the impact-absorbing section 4 in developed form, in which various shapes of holes are disclosed. In these figures, only one reduced-diameter portion is shown. FIG. 8 is a typical example similar to the absorbing section shown in FIGS. 2 and 3. FIG. 9 shows a plurality of circular holes used where the pitch of the holes in the axial direction near tapered portion 46 is smaller than that of the holes at the other portions. FIG. 10 shows elongated holes arranged in a plurality of rows, and the density of holes near tapered portion 46 is larger than that of holes at the other portions. FIG. 11 is similar to FIG. 8 but, in this case, small elongated holes 42' are provided near tapered portion 46. FIG. 12 shows circular holes 42" taking the place of holes 42'. FIG. 13 shows two steps 46" instead of a single tapered portion 46. FIG. 14 shows the end of the hole 42 near tapered portion 46 enlarged in a general key-hole configuration.

In all of these embodiments, the holes are intended to weaken the rigidity of impact-absorbing section 4 in the vicinity of tapered portion 46, thereby decreasing the initial resistance to deformation.

FIGS. 15 and 16 show a third embodiment, in which the safety steering shaft assembly comprises steering shafts 101 and 102, two steering columns 103 and 104, and impact-absorbing section 105. The lower end of shaft 101 is connected directly to the steering gear box 106. Column 103 is also connected to gear box 106 at the lower end and extends through the fire wall 108. Column 104 is is slidably supported by mounting member 146 made of low friction material, which is, in turn, mounted on instrument panel 107. The windshield is indicated at 109, and 110 is the hood. The steering shaft consists of lower shaft 101 and upper shaft 102, the lower portion of the shaft 101 being directly connected to the steering gear box 106, and the upper portion thereof being formed as a hollow cylinder 111. At the upper end of cylinder 111 is a spline boss 112 having an axial length sufficient to transmit rotational force in the normal state.

The portion of cylinder 111 excluding spline boss 112 has a length $l$ and is formed as cylindrical hole 113 having an inside diameter larger than the diameter of spline shaft 121 described hereinafter. The upper end of the upper shaft 102 is connected to steering wheel 105', and the lower end thereof is formed as a spline shaft 121 having a diameter smaller than the inside diameter of cylindrical hole 113. Spline shaft 121 is fitted to the spline boss 112 to form a rotational force transmitting means.

Upper shaft 102 can slide within the cylindrical hole 113 so that the axial length of the shaft assembly can be telescopically reduced, and consequently the length $l$ is appropriately determined in consideration of the necessary reduction of the shaft assembly. The steering column consists of lower column 103 and upper column 104, having tapered portions 132 and 142, respectively, between large diameter portions 131, 141 and small diameter portions 133, 143, respectively. The lower column 103 is externally fitted to the lower shaft 101 with a little clearance. The large diameter portion 131 of lower column 103 directly connects to steering gear box 106. A flexible dust seal cover 114 is fitted to gear box 106 and to the fire wall 108, covering the hole 181 provided in the fire wall 108.

Upper column 104 is fitted over upper shaft 102, to rotatably retain steering shafts 101 and 102 by means of bearing 144. Large diameter portion 143 of the column 104 is slidably fitted to a mounting bracket 146. A cover 145 of synthetic resin or the like is provided near steering wheel 105' for installing electrical components; cover 145 is easily broken on impact of the automobile.

Impact-absorbing section 105, has, as shown in FIG. 16, two absorbing portions 53, 54, each having two reduced-diameter portions 51, and a plurality of holes 52. At the end of section 105 nearest to the upper column, a stopper 55 in the form of an annular flange prevents the impact-absorbing section from moving in the axial direction. Between reduced-diameter portions 51 and large diameter portions 56, 56', 57, 57', 58, there are tapered portions 59 and 59', which all have a slope steeper than those of tapered portions 132 and 142 of the steering column.

The size, shape, number and position of holes 52 of the impact-absorbing section are determined as previously described in connection with other embodiments.

The inside diameter of reduced-diameter portions 51 is made slightly smaller than the outside diameter of small diameter portions 133, 143 of the column, to enable the latter to lightly fit within the former. Stopper 55 presses against mounting bracket 146 to retain the steering shaft assembly on the body of the automobile.

It is necessary that the lengths of small diameter portions 133, 143 of the column fitted within impact-absorbing section 105 be sufficiently long to retain the steering shaft assembly. The inner surfaces of large diameter portions 56 and 58 should be lightly fitted to the outer surfaces of large diameter portions 141 and 131 of the column.

In the normal state, the steering shaft assembly of this embodiment is mounted on the body by means of steering gear box 106 and mounting bracket 146 fixed to instrument panel 107. By fitting impact-absorbing section 105 and the column, the length of the steering shaft assembly is controlled so as to hold the steering wheel 105' at its normal position. Rotation of steering wheel 105' is transmitted to steering gear box 106 through spline shaft 121 and spline boss 112. On impact of the automobile, steering gear box 106 is shifted to a rear position, so that both of lower shaft 101 and lower column 103 are simultaneously pushed up. Lower shaft 101 moves upwardly while upper shaft 102 slides within the hollow portion 111 of lower shaft 101. Tapered portion 132 of lower column 103 presses the tapered portion 59 of the impact-absorbing section to press-widen the inner surface of reduced-diameter portion 51.

Axial force worked on absorbing section 105 by lower column 103 is only transmitted to mounting bracket 146, because stopper 55 restrains it. Thus, taper 142 of upper column 104 does not widen the inner surface of reduced-diameter portion 51 by pressing tapered portion 59 of absorbing section 53. Consequently, although absorbing portion 54 has a greater rigidity than absorbing portion 53, the load caused by the impact is absorbed by portion 54 rather than portion 53. At the moment of impact, sliding frictional resistance is produced between inner surface of reduced-diameter portion 51 and outer surface of small diameter portion 133 of the lower column. Then, as tapered portion 132 slides into reduced-diameter portion 51, the inner surface of portion 51 elastically and plastically deforms to produce a further resistance. Deformation further progresses as large diameter portion 131 slides within the inner surface of reduced-diameter portion 51, to the border between tapered portion 59' and large diameter portion 57 through the border between tapered portion 59 and large diameter portion 58.

Simultaneously, sliding frictional resistance is produced, first, between the inner surface of the deformed, reduced-diameter portion 51 and tapered portion 132 and, then, outer surface of large diameter portion 131. Lower column 103 presses into the inner surface of reduced-diameter portion 51, and impact force is absorbed by all of these resistances. The steering shaft assembly absorbs a portion of the impact energy while reducing its axial length (of course, most of the energy is absorbed by the body of the automobile).

The driver's body is likely to be thrown forward against steering wheel 105' by reaction to the impact. When this happens, upper shaft 102 and upper column 104 are pushed downwards. Upper shaft 102 further enters into cylindrical portion 111 of the lower shaft 101, and upper column 104 slides along the inner surface of mounting bracket 146, to press tapered portion 59 of impact-absorbing section 53 into tapered portion 142 of column 104. Large diameter portion 141 of upper column 104 then press-widens the inner surface of reduced-diameter portion 51.

As upper column 104 is forced to move downward, to reduce the length of the steering shaft assembly, cover 145 is broken against bracket 146 or instrument panel 107. Thus, impact energy is absorbed by the absorbing section 54 and the movement of absorbing section 105 is prevented by stopper or flange 55. The driver's impact on the wheel is absorbed by section 53, as tapered portion 142 of column 104 slides thereinto. The relationship between the load working on the driver and the distance of movement of the column is substantially the same as shown in FIG. 4. In this embodiment, the combination of spline boss-spline shaft is used as a rotational force transmitting means, but other modifications, such as shown in FIGS. 6 and 7, may be used. With respect to the shape, size, position and number of holes in the absorbing section, it is the same as in the cases of other embodiments.

Figure 17:
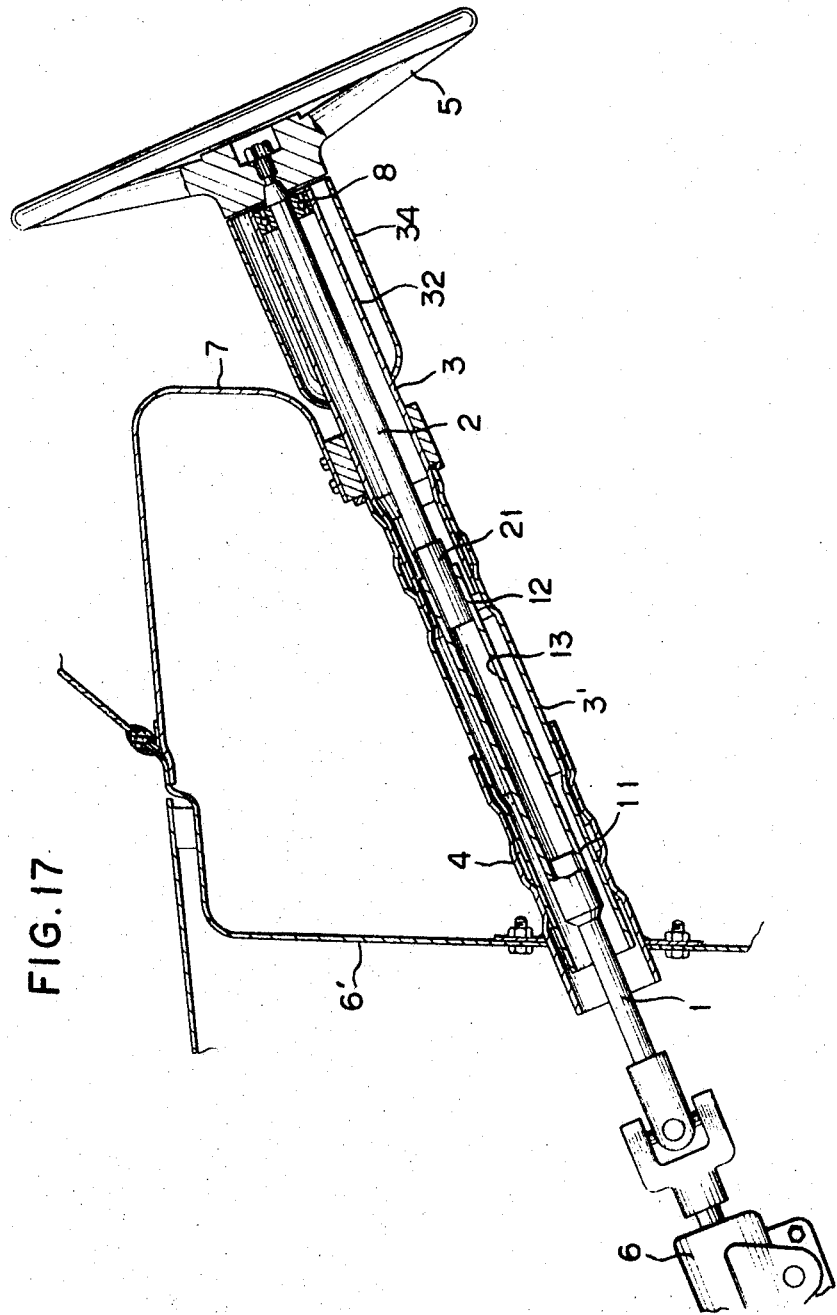
FIG. 17 is a cross-sectional elevation of a fourth embodiment of the invention.

FIG. 17 shows an embodiment which is a modification of the second embodiment shown in FIG. 5. In this embodiment, column 3 is separated into two columns 3 and 3'. Column 3' fits within impact absorbing section 4, just as shown in FIG. 5. The upper end of column 3' is formed as a second impact-absorbing section similar to section 53 in FIG. 16, and column 3 fits therein. This increases the available distance of movement of the column, and it can thus absorb more impact energy.

FIG. 18 shows an embodiment which is a modification of the embodiment of FIG. 15, in which the lower column 103 is fixed to the fire wall 108 rather than steering gear box 106.

Various changes in the details, steps, materials and arrangements of parts, which have been herein described and illustrated in order to explain the nature of the invention, may be made by those skilled in the art within the principle and scope of the invention as defined in the appended claims and their equivalents.

We claim:
1. A safety steering assembly for an automobile which comprises:
   a steering shaft assembly comprising a lower shaft connected to a steering gear box of the automobile, an upper shaft connected to a steering wheel of the automobile, means to fit one of said shafts within the other of said shafts, and transmission means to transmit rotational force from one shaft to the other;
   a column including a large diameter portion, a small diameter portion and a tapered portion positioned therebetween, said column externally fitting and rotatably retaining said shaft assembly; and
   an impact-absorbing section having a reduced-diameter portion containing a plurality of holes, said absorbing section being externally fitted over said column.

2. The safety steering assembly as claimed in claim 1, wherein said impact-absorbing section is rigidly mounted on the body of said automobile.

3. The safety steering assembly as claimed in claim 1, wherein the tapered portion of said column is adjacent the reduced-diameter portion of said impact-absorbing section.

4. A safety steering assembly for an automobile which comprises:
   a steering shaft assembly comprising a lower shaft connected to a steering gear box of the automobile, an upper shaft connected to a steering wheel of the automobile, means to fit one of said shafts within the other of said shafts, and transmission means to transmit rotational force from one shaft to the other;
   a column assembly externally fitting and rotatably retaining said steering shaft assembly and comprising lower and upper columns, each of which includes a large diameter portion, a small diameter portion and a tapered portion positioned therebetween, the large diameter portion of the lower column being rigidly fixed to the steering gear box, and the large diameter portion of the upper column being slidably mounted on the body of the automobile with a mounting bracket; and
   an impact-absorbing section comprising two reduced-diameter portions, each of said portions having a plurality of holes, said impact-absorbing section externally fitting over the inner ends of said upper and lower columns.

5. The safety steering assembly as claimed in claim 4, wherein the tapered portion of each of said columns is adjacent one of the reduced-diameter portions of said impact-absorbing section.

6. The safety steering assembly as claimed in claim 4, wherein the end of said impact-absorbing section fitting over said upper column has an annular flange, said flange pressing against said mounting bracket.

7. A safety steering assembly for an automobile which comprises:
   a steering shaft assembly comprising a lower shaft connected to a steering gear box of the automobile, an upper shaft connected to a steering wheel of the automobile, means to fit one of the shafts within the other of the shafts, and transmission means to transmit rotational force from one shaft to the other;
   an upper column externally fitting and rotatably retaining said upper shaft, said upper column having a large diameter portion slidably mounted on said automobile on a mounting bracket, a small diameter portion at its lower end and a tapered portion therebetween;
   an intermediate column externally fitting over the lower end of said upper column and including at its upper end a first impact-absorbing section having a reduced-diameter portion including a plurality of holes, and further including, at its lower end, a small diameter section and a tapered section; and
   a lower column rigidly mounted on the body of said automobile and fitting over the small diameter section of said intermediate column and including a second impact-absorbing section of reduced-diameter and having a plurality of holes.

8. The safety steering assembly as claimed in claim 7, wherein the reduced-diameter portion of said first impact-absorbing section is adjacent the tapered portion of said upper column, and the reduced-diameter portion of said second impact-absorbing section is adjacent the tapered section of said intermediate column.

9. The safety steering assembly as claimed in claim 7, wherein the upper end of said intermediate column has an annular flange, said flange pressing against said mounting bracket.

References Cited

UNITED STATES PATENTS

| | | | |
|---|---|---|---|
| 3,181,821 | 5/1965 | Eddins | 188—1 |
| 3,308,908 | 3/1967 | Bunn | 188—1 |
| 3,373,629 | 3/1968 | Wight et al. | 74—492 |
| 3,373,630 | 3/1968 | Heurtebise | 74—492 |
| 3,392,599 | 7/1968 | White | 74—492 |

MILTON KAUFMAN, Primary Examiner

U.S. Cl. X.R.

180—78; 188—1; 280—87